United States Patent Office 3,080,365
Patented Mar. 5, 1963

3,080,365
NOVEL DIURETICS AND SEDATIVES
Charles F. Geschickter, Kensington, Md., and Jacob R. Meadow, Lorton, Va., assignors to The Geschickter Fund for Medical Research, Inc., Washington, D.C., a corporation of New York
No Drawing. Filed Mar. 13, 1961, Ser. No. 95,030
13 Claims. (Cl. 260—247.2)

The present invention relates to novel compositions of matter and more particularly to amino derivatives of eugenol and isoeugenol.

At the present time, various compounds having sedative or diuretic properties are known. Unfortunately, a good number of these are known to induce injurious side and after effects. Quite obviously, these harmful side and after effects either seriously limit or prevent the practical use of these compounds for their intended purposes.

For example, at the present time, diuretics in commercial use fall into two general classes: (1) compounds containing mercury, known as mercurials, and (2) exchange resins. While both mercurials and exchange resins have useful diuretic properties, mercurials have a rather high toxicity and cannot be used in cases where there is kidney damage. Exchange resins have the disadvantage that they can be administered only orally. In addition, all known diuretics have only slight effect in removing potassium from the system.

It is accordingly a primary object of the present invention to provide novel compositions of matter having improved diuretic and sedative properties.

It is a further object of the present invention to provide a novel class of compounds having improved diuretic activity, of the general formula:

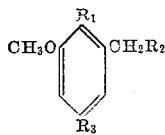

wherein $R_1$ is either —OH or

$R_2$ is selected from the group consisting of morpholino, piperidino, 2-methyl piperidino, pyrrolidino and piperazino; and $R_3$ is either —$CH_2CH=CH_2$ or $CH_3CH=CH$—; and the non-toxic acid addition salts of this class of compounds.

It is another object of the present invention to provide a novel class of compounds having improved sedative activity, of the general formula:

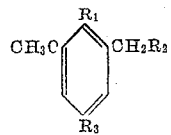

wherein $R_1$ is either —OH or

$R_2$ is 2,6-dimethylmorpholino; and $R_3$ is either

or $CH_3CH=CH$—
and the non-toxic acid addition salts of this class of compounds.

Other objects and advantages will become apparent upon reference to the specification and appended claims.

Applicants have discovered a class of compounds some of which have excellent diuretic properties and others of which have superior sedative characteristics, yet which do not produce the undesirable side and after effects of prior compositions. These compounds are all of the class known as eugenols and isoeugenols and have the following general formula:

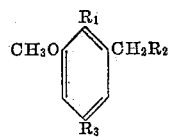

where $R_1$ is

or —OH; $R_2$ is selected from the group consisting of morpholino, piperidino, 2-methyl piperidino, pyrrolidino, piperazino, and 2,6-dimethylmorpholino; and $R_3$ is either —$CH_2$—$CH=CH_2$ or $CH_3CH=CH$—.

Of the above class of compounds, those in which $R_1$ is

or —OH; $R_2$ is selected from the group consisting of morpholino, piperidino, 2-methyl piperidino, pyrrolidino and piperazino; and $R_3$ is either —$CH_2$—$CH=CH_2$ or $CH_3CH=CH$— have remarkable diuretic activity without undesirable side or after effects. Contrary to the inability of previously known diuretics to have other than slight effect in removing potassium from the system, these compounds will remove water, salt and potassium with relatively equal facility yet have a surprisingly low toxicity. In addition, the diuretic effect of these compounds is not transitory but will persist in animals for six to eight hours.

Of the diuretics of the instant invention, the eugenol derivatives have about twice the effectiveness of the isoeugenols. And while the piperazino and pyrrolidino derivatives have satisfactory diuretic properties, the piperidino, morpholino and 2-methyl piperidino derivatives are preferred.

Those compounds of the class set forth above in which $R_1$ is

or —OH; $R_2$ is 2,6-dimethylmorpholino; and $R_3$ is

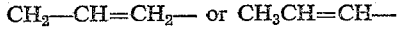

on the other hand, exhibit a surprising lack of diuretic activity but have excellent physiological activity as central depressants. In general, they possess some of the effects of the barbiturates without having the serious depressant action of the latter. They are central depressants which act on the central nervous system to change the character and depth of breathing, lower body temperature and are also anti-convulsants.

As will be made clear by the examples set forth below, all of the $R_2$ substituents of the compounds of the present invention may be introduced into the aromatic ring of eugenol or isoeugenol to form the free base by means of the Mannich reaction.

The free base is insoluble in water but can be readily made soluble by salting the free base with an appropriate acid. For example, the free base may be salted with hydrochloric, iodic, bromic, sulfuric, acetic, succinic, maleic, phosphoric, benzoic, lactic, thiodisalicylic, mucic, citric and tartaric acids and the like. Sulfone and sulfate acids are particularly effective for this purpose, the salting of the free base with dimethanesulfonamide producing a particularly desirable product.

Examples of the preparation of the compounds of the present invention follow:

EXAMPLE I

Preparation of the Morpholine Mannich Derivative of Eugenol

Eugenol, 49.2 g. (0.3 mole), was dissolved in 50 cc. of 95% ethanol, and 26.1 g. (0.3 mole) of redistilled morpholine was added to the cold alcoholic solution. The mixture was kept in an ice bath and 27.0 g. (0.3 mole) of 37% aqueous formaldehyde was slowly and cautiously added. The resulting mixture was allowed to stand an additional hour at room temperature and was then heated under reflux for a period of six hours. After being permitted to cool overnight, the crude crystalline product was separated rapidly by suction filtration to prevent melting of the impure derivative. The product was then recrystallized twice from an aqueous methanol solution (4 volumes of methanol to 1 volume of water). A fine white crystalline product weighing 42 g. and melting at 48–49° C. was obtained. The equivalent weight by titration was 263.0 (theory 263.3).

The reaction is indicated by the following equation:

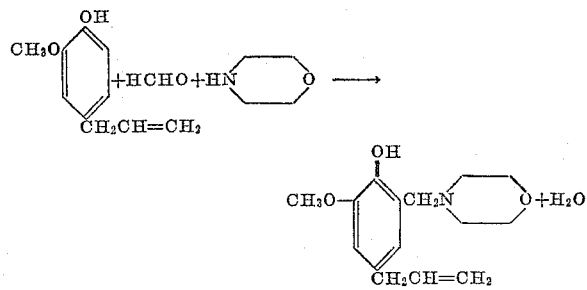

The corresponding isoeugenol derivatives of other secondary amines such as piperidine, 2-methyl piperidine, pyrrolidine and piperazine are prepared in substantially the same way, substituting the appropriate secondary amine for morpholine in the same molar ratio.

The free base above was solubilized as follows: 26.0 g. of the morpholine derivative of eugenol and 16.64 g. of dimethanesulfonamide were added to distilled water and diluted to a volume of 260 cc. On a percentage basis, the Mannich free base comprised 60.9% of the salt.

The free base can also be salted with other acids by following substantially the same procedure.

EXAMPLE II

Preparation of the Morpholine Mannich Derivative of Isoeugenol

Isoeugenol (4.92 g., 0.03 mole), morpholine (2.61 g., 0.03 mole) and 1.5 cc. of 95% ethanol were mixed and cooled to 0° C. Formaldehyde (2.7 g. of 37% aqueous solution, 0.03 mole) was added dropwise to the cold solution. After being permitted to stand at room temperature for approximately one hour, the reaction mixture was refluxed for a period of 5 hours. The resulting mixture was then chilled overnight and 5.8 g. of white crystalline product was isolated by suction filtration. Recrystallization was accomplished using aqueous methanol (about 80% $CH_3OH$), followed by treatment with absolute methanol. The melting point of the purified product was 87–89° C. The equivalent weight by titration was found to be 263.8 (theory 263.3).

The reaction is indicated as follows:

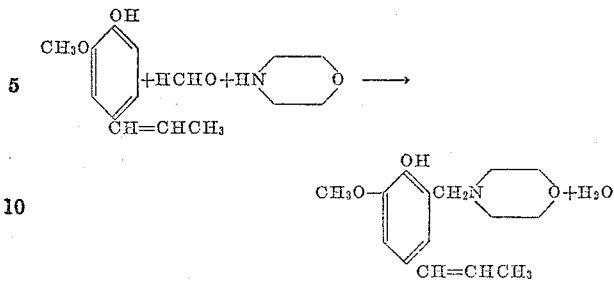

As in the case of isoeugenol, eugenol derivatives of the other secondary amines such as piperidine, 2-methyl piperidine, pyrrolidine and piperazine may be prepared in the same manner by substituting the appropriate secondary amine for morpholine in the same molar ratio as in the preceding example.

In order to form a salt, dimethanesulfonamide (Eastman White Label No. 6382), weighing 26.3 grams (0.152 mole), was dissolved in 240 cc. distilled water. 40.0 grams (0.152 mole) of the compound of Example II was dissolved in 120 cc. 95% ethanol. The alcohol solution was poured slowly into the aqueous solution with moderate stirring. The resulting solution was stirred well and placed in an evaporating dish and maintained at 90°–100° C. by means of a boiling water bath. After evaporation to dryness, the salt was pulverized and dried overnight in a vacuum desiccator. The white or yellow powder melts over the range 132°–134° C.

EXAMPLE III

Preparation of 4-Allyl-6-Methoxy-2-(2,6-Dimethylmorpholinomethyl)Phenol

This compound was prepared by carrying out a Mannich reaction with 3.5 grams of 2,6-dimethylmorpholine (0.03 mole), 4.9 grams of eugenol (0.03 mole), and 2.7 grams of aqueous formaldehyde solution (37–40%). The eugenol and 2,6-dimethylmorpholine were mixed together with 5 ml. of 95% ethyl alcohol as a diluent, and the mixture was kept cold by means of an ice bath. The formaldehyde solution was then added very slowly to the cold mixture and the contents allowed to stand in a round bottom flask for at least one hour at approximately room temperature before refluxing gently for three and one-half hours on a steam bath. The reaction mixture was then poured into a beaker and the crude product, an oil, was washed several times with cold water. It was then taken up with a small amount of 80% methanol-water and allowed to stand overnight, the oily mass gradually solidifying on standing. The solid was crushed to a fine powder after being well dried and was then washed several times with petroleum ether or ligroin. The peculiar solubility properties of the compound made it difficult to use a suitable organic solvent for purification by the usual process of recrystallization. However, the procedure described here produced a satisfactory product, melting rather sharply at 77–78° C. The observed equivalent weight was 292.8 and the calculated value is 291.4. The compound dissolves readily in the usual dilute mineral and organic acids.

The Manniched isoeugenol may be prepared in a manner similar to that described in Example II.

EXAMPLE IV

Preparation of the Acetate Ester of 4-Allyl-6-Methoxy-2-(2,6-Dimethylmorpholinomethyl)Phenol This ester was prepared from 19.6 grams (0.05 mole) of 4-allyl-6-methoxy-2-(2,6-dimethylmorpholinomethyl)phenol and a slight excess (0.06 mole) of acetic anhydride was added dropwise from a dropping funnel. Approximately 30 ml. of benzene was used as a diluent and the mixture was stirred continuously by means of a mechanical stirrer at room temperature. The benzene solution was then washed four times with 50 ml. portions of cold water and dried over anhydrous calcium chloride. The benzene extract was then reduced to one-third of its original volume by evaporation under reduced pressure. Long needle-like colorless crystals separated from the solution on standing several hours. The crystals were washed twice with petroleum ether and then recrystallized from a larger volume of ligroin, boiling range 60–100° C. The product melted at 59–62° C. and dissolved readily in dilute acids. The experimental equivalent weight determination was 334; the calculated value is 333. The yield of the recrystallized product was about 50–60% of the theoretical amount.

The Manniched isoeugenol may be prepared in a manner similar to that described in Example II.

To demonstrate the effectiveness of the diuretics, the dimethanesulfonamide salt of the morpholine Mannich derivative of eugenol was administered to rats intramuscularly in a 50 mg./cc. water solution and studies were made in dosages of 50 mg./kg. of body weight. At this level there was a marked diuretic response. The toxicity of the compound in rats is above 500 mg./kg. of body weight. The compounds may also be administered orally and in dosages of 15 mg./kg. the dimethanesulfonamide salt induced a marked diuretic response in rats.

The same material was also tested on dogs and was administered intravenously. In one dog, the material was administered in two successive 5 mg./kg. dosages followed by a dose of 25 mg./kg., and in a second dog, the material was administered in a single 5 mg./kg. dosage. In both dogs, marked diuretic effects were obtained.

Microscopic studies were made of the organs of the various dogs and rats and no pathological damage was observed in any of the organs of the dogs or rats. The studies showed that the compound is a potent diuretic and that diuresis is not transitory but is prolonged within limits of six to eight hours.

The sedatives of the present invention have an LD–50% in rats of approximately 450 mg./kg., I.P., and are effective in dosages of 100–300 mg. in capsule form two times a day to control fever and for their sedative action. When administered by injection for these purposes, they can be injected in dosages of 100–200 mg. in a propylene glycol-benzyl alcohol solution (100 parts by weight of the dimethylmorpholino compound; 10–20 parts by weight of the glycol; and 5–10 parts by weight of the alcohol). They can as well be given I.V. to produce sleep and to serve as a short duration anesthetic in dosages of 50–75 mg. These compounds also serve to increase the speed and degree of action of local anesthetics in a dosage of 100 mg. I.M. or 300 mg. orally.

This application is a continuation-in-part of applicants' copending application Serial No. 740,559, filed June 4, 1958.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The compound selected from the group consisting of (1) compounds of the formula

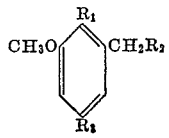

where $R_1$ is selected from the group consisting of —OH and

$R_2$ is selected from the group consisting of morpholino, piperidino, 2-methylpiperidino, pyrrolidino, piperazino, 2,6-dimethylmorpholino; and $R_3$ is selected from the group consisting of —$CH_2CH=CH_2$ and $$CH_3CH=CH—$$

and (2) the non-toxic acid addition salts of (1).

2. The compound of the formula

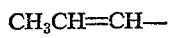

3. The non-toxic acid addition salts of the compound of claim 2.

4. The compound of the formula

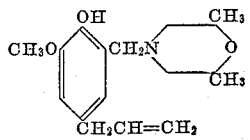

5. The non-toxic acid addition salts of the compound of claim 4.

6. The compound of the formula

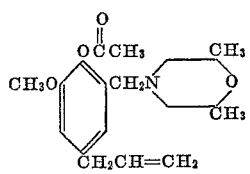

7. The non-toxic acid addition salts of the compound of claim 6.

8. The compound of the formula

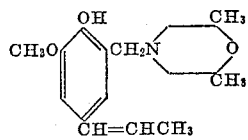

9. The non-toxic acid addition salts of the compound of claim 8.

10. The compound of the formula

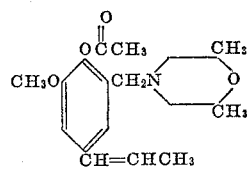

11. The non-toxic acid addition salts of the compound of claim 10.

12. The compound of the formula

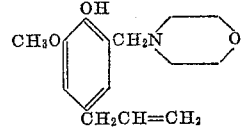

13. The non-toxic acid addition salts of the compound of claim 12.

No references cited.